United States Patent
Ando

(10) Patent No.: US 6,712,469 B2
(45) Date of Patent: Mar. 30, 2004

(54) VIDEO PROVIDING APPARATUS

(75) Inventor: Takahisa Ando, Nara (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/303,727

(22) Filed: Nov. 26, 2002

(65) Prior Publication Data

US 2003/0103190 A1 Jun. 5, 2003

(30) Foreign Application Priority Data

Nov. 30, 2001 (JP) ........................................ 2001-366808

(51) Int. Cl.$^7$ ................................................. A61B 3/10
(52) U.S. Cl. ...................................... 351/211; 351/221
(58) Field of Search .............................. 351/205, 206, 351/214, 221, 222, 211, 237, 238, 239, 243

(56) References Cited

U.S. PATENT DOCUMENTS 4,541,697 A * 9/1985 Remijan ..................... 351/211

OTHER PUBLICATIONS

Takahisa Ando et al., Retinal Projection Display using Holographic Optical Element, The International Society for Optical Engineering, Reprinted from Practical Holography XIV and Holographic Materials VI on vol. 3956, Jan. 24–25, 2000, San Jose, California.

Takashi Ando et al., A See–through Display using the Maxwellian View with Holographic Optical Elements, The Journal of the Institute of Image Information and Television Engineers, Oct. 2000, vol. 54, No. 10 2000.

* cited by examiner

*Primary Examiner*—George Manuel

(57) ABSTRACT

There is provided a video providing apparatus capable of giving clear video to a patient with an eye disease. The video providing apparatus comprises a parallel light source or a parallel light type LED as a light source. Video light obtained by passing light from the light source through a liquid crystal display panel is supplied to an ocular optical system (Maxwellian view). In this configuration, the ocular optical system comprises a lens and a pinhole. The lens is provided such that the rear focal point thereof is positioned in close proximity to the eyeball of a viewer (a patient with an eye disease). The pinhole is arranged at the rear focal point, thereby causing a viewer to view video by Maxwellian view.

18 Claims, 6 Drawing Sheets

(a)

(a)

(b)

(c)

(a)

(b)

VIDEO PROVIDING APPARATUS

BACKGROUND OF THE INVENTION

Field of the Invention

The present invention relates to a video providing apparatus.

When a viewer has a disease in a part of the retina, an external light introduced into a disease portion out of external light projected onto the retina by the crystalline lens of the eyeball is not perceived, so that video in a portion, corresponding to the disease portion, in view seems as if it were missing, for example. Particularly when the disease portion exists at the center of the retina, a large part of an important portion of information from the external world is lost. When a viewer has a disease in the light transmittance of the crystalline lens, a pupil (hole) is artificially formed outside the crystalline lens. Even by the artificial pupil, however, the viewer cannot see clear video. When a viewer has a disease in the focus accommodation function of the crystalline lens, the viewer wears glasses. However, it is difficult for a lens in a pair of glasses to correspond to a bifocal without being divided into regions. When the focusing function of the crystalline lens is lost, the external light cannot be formed on the retina. Even if the darkness and brightness of the external world can be recognized, therefore, it is difficult to clearly recognize the video.

SUMMARY OF THE INVENTION

In view of the foregoing circumstances, an object of the present invention is to provide a video providing apparatus capable of giving clear video to a patient with an eye disease.

A video providing apparatus according to the present invention is characterized by comprising a light source comprising a light emitter for emitting non-oscillation natural emission light; a video producing optical system for modulating the light from the light source in an spatial light modulator and outputting video light; a convergent element for converging the video light; and a pinhole arranged at the rear focal point of the convergent element, a viewer being caused to view video by Maxwellian view.

In the above-mentioned configuration, the video produced by the spatial light modulator (e.g., video obtained by imaging the external world using a CCD (Charge Coupled Device) camera) is directly projected onto the retina without being affected by the lens function in the crystalline lens of the eyeball. Even when there is only a narrow optical path due to the artificial pupil or the corneal opacity, the video can be directly projected onto the retina. The light source comprising the light emitter for emitting the non-oscillation natural emission light is used, thereby making it possible to restrain the production of coherent noise (video noise). Further, the video providing apparatus has the pinhole. Even when the light from each of pixel portions of the spatial light modulator has a slight expanse (e.g., even in a case where an LED (Light Emitting Diode) or the like is used as a light source), a bundle of light rays is narrowed down, thereby making it possible to give a large depth of focus to recognize clear video.

A video providing apparatus according to the present invention is characterized by comprising a light source comprising a light emitter for emitting non-oscillation natural emission light; a video producing optical system for modulating the light from the light source in an spatial light modulator and outputting video light; a first convergent element for converging the video light; and an optical system comprising a pair of second convergent elements provided between the video producing optical system and the first convergent element, and a pinhole arranged at the mutual focal points of the second convergent elements, a viewer being caused to view video by Maxwellian view.

In the above-mentioned configuration, the video produced by the spatial light modulator (e.g., video obtained by imaging the external world using a CCD camera) is directly projected onto the retina without being affected by the lens function in the crystalline lens of the eyeball. Even when there is only a narrow optical path due to the artificial pupil or the corneal opacity, the video can be directly projected onto the retina. The light source comprising the light emitter for emitting the non-oscillation natural emission light is used, thereby making it possible to restrain the production of coherent noise (video noise). Further, the video providing apparatus has the pinhole. Even when the light from each of pixel portions of the spatial light modulator has a slight expanse (e.g., even in a case where an LED or the like is used as a light source), a bundle of light rays is narrowed down, thereby making it possible to give a large depth of focus to recognize clear video. Further, a conjugate points of the pinhole can be placed at the center of the pupil of the eyeball, thereby making it possible to give wider view to a patient with an eye disease, as compared with that in a configuration in which the pinhole is directly placed in front of the eyes.

It is desirable that the light source is a parallel light source for converting dispersive light into parallel light and giving the parallel light to the spatial light modulator.

The parallel light source may comprise a pinhole at the mutual focal points of a pair of convergent elements.

The pinhole in the parallel light source may be provided with light diffusion means.

A video providing apparatus according to the present invention is characterized by comprising a light source comprising a light emitter for emitting non-oscillation natural emission light; a video producing optical system for converging dispersive light from the light source to provide the convergent light to an spatial light modulator, and outputting video light in the converging state modulated by the spatial light modulator; a pinhole provided at a converging point of the video light in the converging state; and an optical element for converging the video light in the dispersive state which has passed through the pinhole and positioning the converging point at the position of the eyeball of a viewer, the viewer being caused to view video by Maxwellian view.

In the above-mentioned configuration, the video produced by the spatial light modulator (e.g., video obtained by imaging the external world using a CCD camera) is directly projected onto the retina without being affected by the lens function in the crystalline lens of the eyeball. Even when there is only a narrow optical path due to the artificial pupil or the corneal opacity, the video can be directly projected onto the retina. The light source comprising the light emitter for emitting the non-oscillation natural emission light is used, thereby making it possible to restrain the production of coherent noise (video noise). Further, the video providing apparatus has the pinhole. Even when the light from each of pixel portions of the spatial light modulator has a slight expanse (e.g., even in a case where an LED or the like is used as a light source), a bundle of light rays is narrowed down, thereby making it possible to give a large depth of focus to recognize clear video. Further, a conjugate points of the pinhole can be placed at the center of the pupil of the eyeball, thereby making it possible to give wider view to a patient with an eye disease, as compared with that in a configuration in which the pinhole is directly placed in front of the eyes. Further, the necessity of an optical system required to convert dispersive light into parallel light is eliminated, thereby making it possible to reduce the optical path length to miniaturize the video providing apparatus.

In the video providing apparatuses having the configurations, the light source may be a white light source, and the spatial light modulator may comprise respective modulators for read light, green light, and blue light.

Consequently, color video can be provided to the patient with an eye disease.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
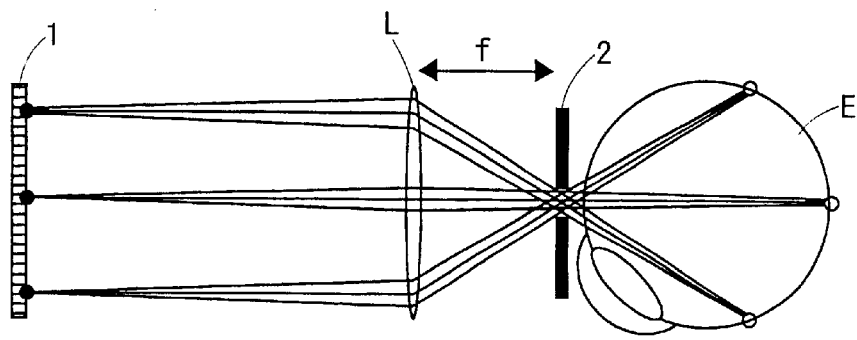
FIG. 1(a) is an explanatory view showing the schematic configuration of a video providing apparatus according to the present invention and showing how video light emitted therefrom is introduced into the eyeball.
FIGS. 1(b) and 1(c) are reference views for comparison.
Figure 1:
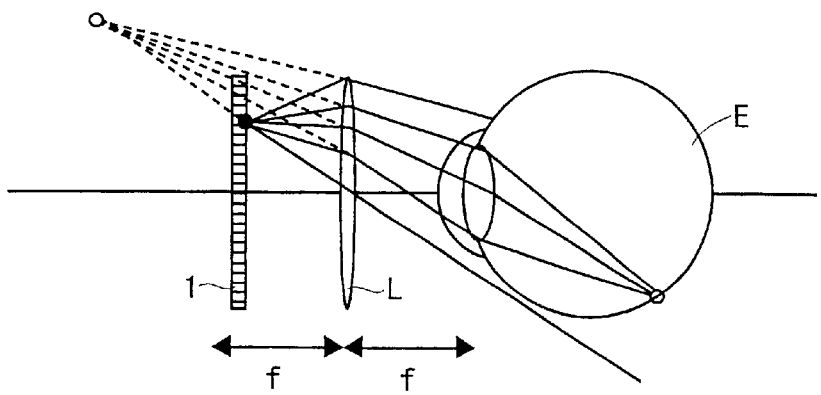
Figure 1:
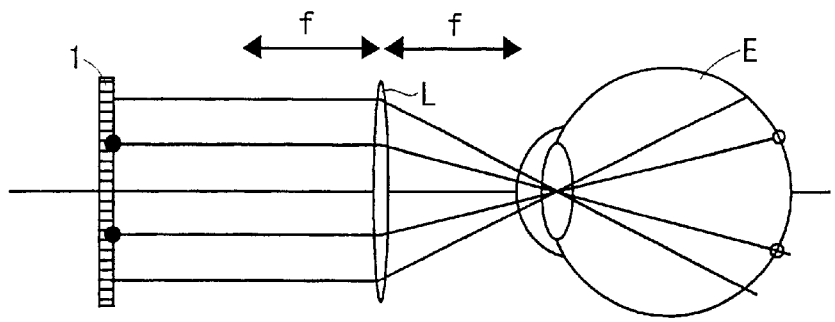

A video providing apparatus according to an embodiment of the present invention will be described on the basis of FIGS. 1 to 6.

FIG. 1(a) illustrates the schematic configuration of the video providing apparatus and shows how video light emitted therefrom is introduced into the eyeball E. FIGS. 1(b) and 1(c) are reference views for comparison, which do not describe the present invention. FIG. 2(a) illustrates a telecentric optical system, and FIG. 2(b) illustrates a normal lens optical system.

FIG. 1(b) which is the reference view illustrates an optical system used in a head mount display or the like. In such an optical system, video light obtained through a liquid crystal display panel 1 which is an spatial light modulator is introduced into the eyeball E of a viewer by a lens L. The lens L is not used for forming an image on the retina of the eyeball E, and is merely used as a lens for obtaining an enlarged virtual image. That is, an image is formed on the retina by the lens function of the crystalline lens of the eyeball E. Accordingly, clear video cannot be provided to a patient with an eye disease without the premise that the focus accommodation function of the crystalline lens is normal.

In FIG. 1(c) which is the reference view, a patient with an eye disease is caused to view video by Maxwellian view, as in the present invention, which differs from the present invention in that a laser light source (an oscillation light source) is used as a light source. In such a configuration, it is difficult to color the video, and coherent noise (video noise) is liable to be produced.

As shown in FIG. 1(a), in the video providing apparatus according to the present invention, a light source composed of an LED or the like for emitting non-oscillation natural emission light is used, and the light is projected onto the retina (a lens L is used for forming an image on the retina of the eyeball E) by a telecentric optical system (a configuration in which a diaphragm (a pinhole 2) is placed at the rear focal point of the lens L). Since the LED light source is used, light from a video light emitting point (each aperture of a liquid crystal display panel 1) has a slight expanse. However, a bundle of light rays is narrowed down by the pinhole 2 (e.g., a diameter of 0.6 mm) constituting the telecentric optical system, thereby increasing the depth of focus. The video produced by the liquid crystal display panel 1 is directly projected onto the retina without being affected by the lens function in the crystalline lens of the eyeball E, thereby giving clear video to a patient with an eye disease. Of course, even when there is only a narrow optical path due to the artificial pupil or the corneal opacity, the video can be directly projected onto the retina (the case of the artificial pupil is illustrated in the drawings).

Figure 2:
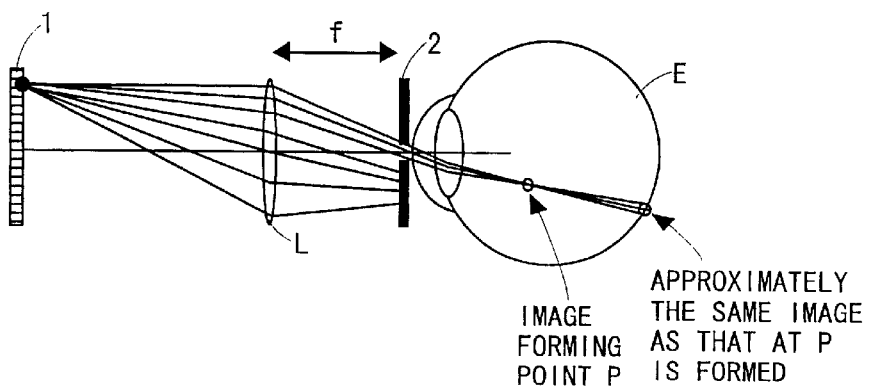
FIG. 2(a) is an explanatory view showing a telecentric optical system.
FIG. 2(b) is an explanatory view showing a normal lens optical system.
Figure 2:
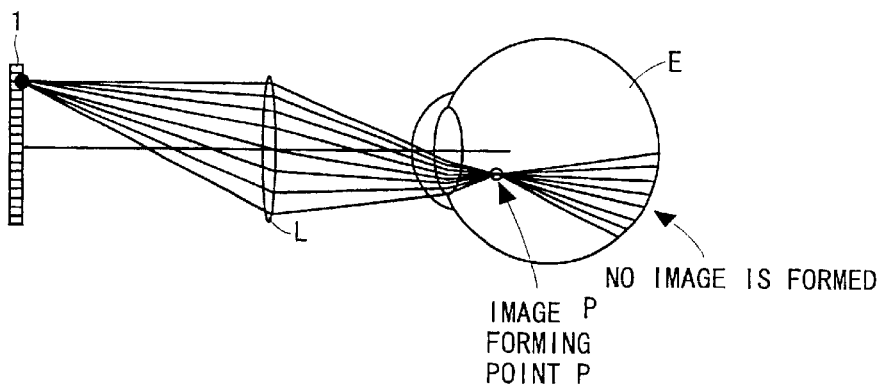
Figure 3:
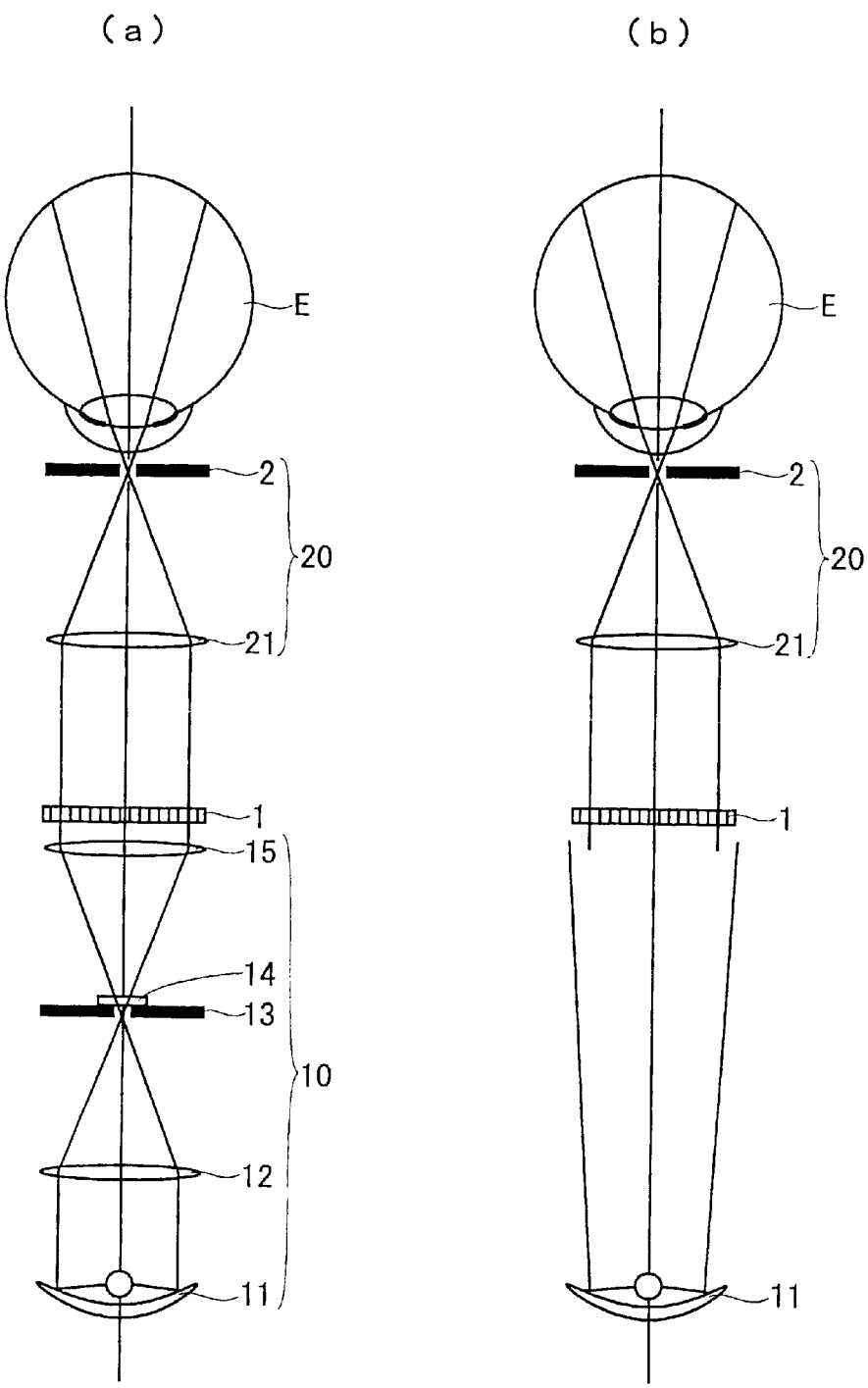
FIG. 3(a) is an explanatory view showing a specific example of a video providing apparatus according to the present invention.
FIG. 3(b) is an explanatory view showing another specific example of the video providing apparatus according to the present invention.

The LED light source is thus used, thereby restraining the production of the coherent noise (video noise). Further, by using a white LED as the LED and using a color liquid crystal display panel, color video can be provided to the patient with an eye disease. FIG. 2(a) shows a state where the telecentric optical system is viewed through the normal eyeball, and the telecentric optical system is changed to a normal optical system shown in FIG. 2(b) if the pinhole 2 is removed. The lens L and its focal length f, the liquid crystal display panel 1, and their arrangement relationship are the same as those shown in FIG. 1(a). In FIG. 1(a), the liquid crystal display panel 1 and the retina are in a conjugate relationship, that is, the video on the liquid crystal display panel 1 is formed on the retina of the eyeball E by the image forming function of the lens L. In this state, in the configuration shown in FIG. 2 in which the crystalline lens of the eyeball E is arranged between the lens L and the retina of the eyeball E, an image forming point P of one point displayed on the liquid crystal display panel 1 and the retina are shifted. In this state, in the normal optical system shown in FIG. 2(b), light expanded from the point P is irradiated onto the retina of the eyeball E, so that no image is formed on the retina. In FIG. 2(a), however, light expanded between the image forming point P and the retina is restricted by the function of the pinhole 2. Accordingly, the same light as that at the image forming point P can be viewed on the retina. That is, the telecentric optical system shown in FIG. 2(a) can present video having a very large depth of focus because the image forming conditions of the lens L hold from the state shown in FIG. 1(a) (there is no crystalline lens of the eyeball) to a case where there is a crystalline lens as shown in FIG. 2(a).

The specific configuration of the video providing apparatus will be described.

A video providing apparatus shown in FIG. 3(a) comprises a parallel light source 10. The parallel light source 10 comprises a parallel light type LED 11 having a high luminance, a lens 12, a pinhole 13, a diffusion panel 14, and a lens 15. The parallel light type LED 11 comprises an LED element and a parabolic mirror. The lens 12 and the lens 15 are arranged spaced from each other by a distance which is the sum of both their focal lengths so that the pinhole 13 transmits light from the light source at a beam waist. The diffusion panel 14 transmits the light from the light source, thereby obtaining light whose luminance distribution is flattened. Video light obtained through the liquid crystal display panel 1 is supplied to an ocular optical system (Maxwellian view) 20. In this configuration, the ocular optical system 20 comprises a lens 21 and a pinhole 2. The lens 21 is provided such that the rear focal point thereof is positioned in close proximity to the eyeball E of a viewer (a patient with an eye disease). The pinhole 2 is arranged at the rear focal point, thereby causing the viewer to view video by Maxwellian view.

In a video providing apparatus shown in FIG. 3(b), a parallel light type LED 11 having a high luminance is used as a light source, and light emitted from the parallel light type LED 11 is supplied as it is to a liquid crystal display panel 1. Video light obtained through the liquid crystal display panel 1 is introduced into the eyeball E of a viewer by an ocular optical system 20. In such a configuration, the parallelism of the light from the light source is lower than that in the configuration shown in FIG. 3(a), so that the light is somewhat more greatly lost. However, the number of optical elements is small, which is favorable for simplification of the configuration and reduction of the cost.

Figure 4:
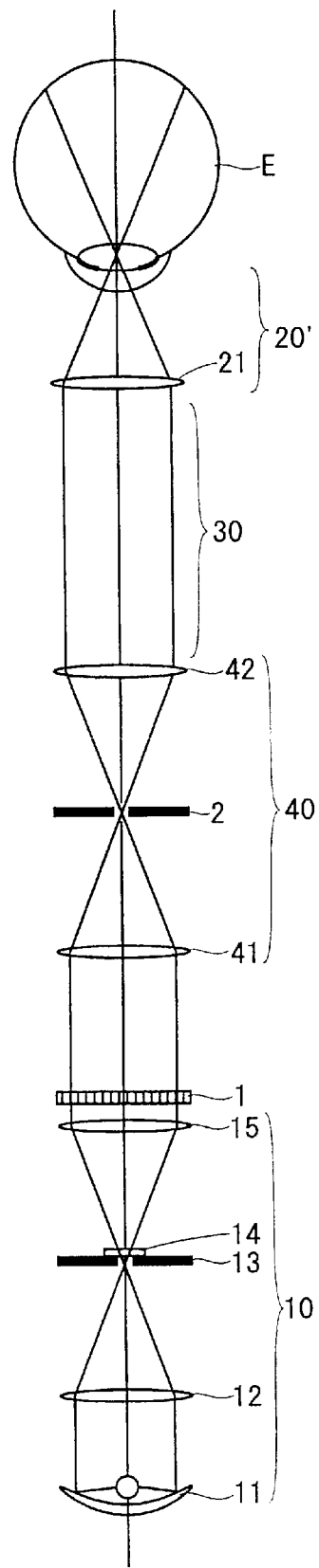
FIG. 4 is an explanatory view showing another specific example of a video providing apparatus according to the present invention.
Figure 5:
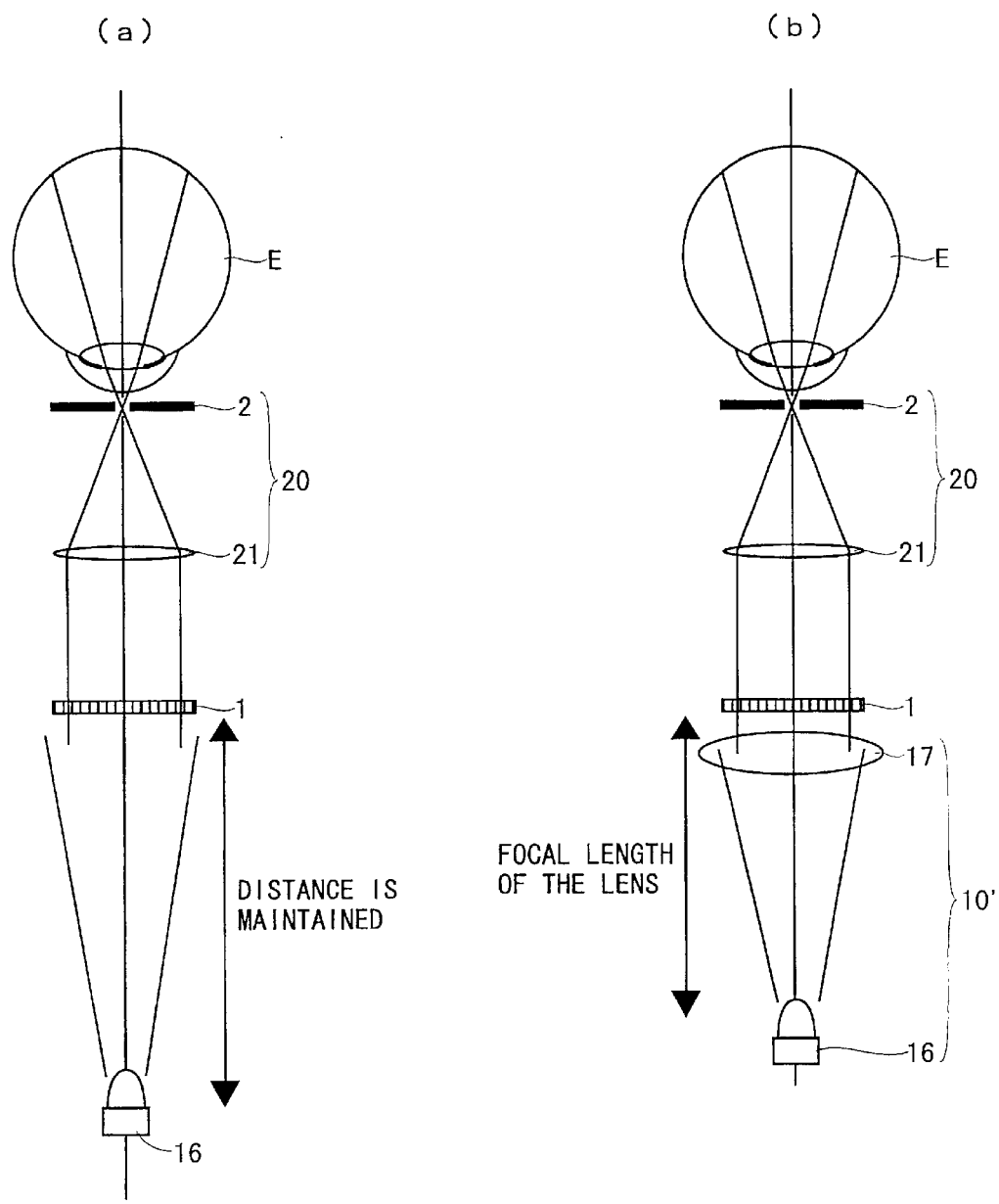
FIG. 5(a) is an explanatory view showing another specific example of a video providing apparatus according to the present invention.
FIG. 5(b) is an explanatory view showing another specific example of the video providing apparatus according to the present invention.
Figure 6:
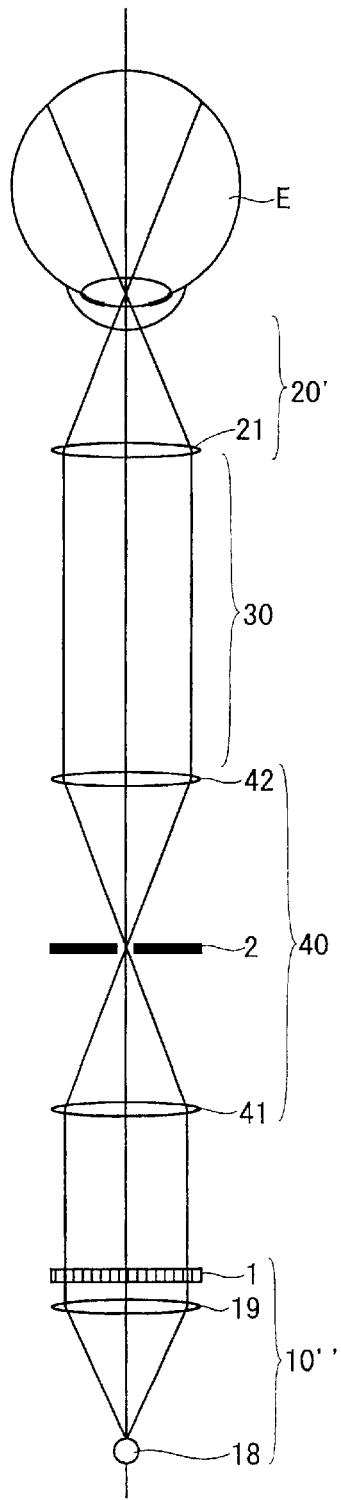
FIG. 6(a) is an explanatory view showing another specific example of a video providing apparatus according to the present invention.
FIG. 6(b) is an explanatory view showing another specific example of the video providing apparatus according to the present invention.
Figure 6:
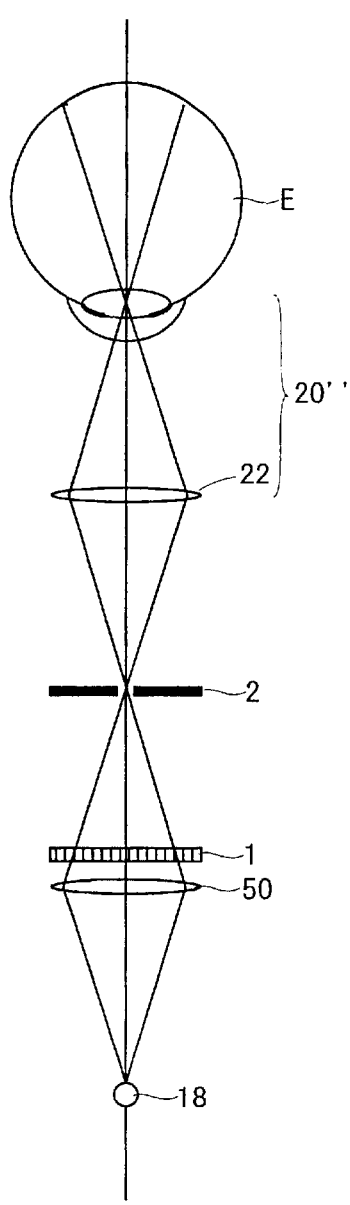

A video providing apparatus shown in FIG. 4 comprises the above-mentioned parallel light source 10 as a light source. Video light obtained by passing parallel light from the parallel light source 10 through a liquid crystal display panel 1 is introduced into a re-diffraction optical system 40. The re-diffraction optical system 40 comprises a lens 41, a lens 42, and a pinhole 2. The lens 41 and the lens 42 are arranged spaced from each other by a distance which is the sum of both their focal lengths so that the pinhole 2 transmits the video light at a beam waist. The video light which has passed through the re-diffraction optical system 40 is introduced into an ocular optical system 20' through a relay optical system 30 composed of a relay lens or the like. In the configuration, the ocular optical system 20' is composed of only a lens 21. The lens 21 is provided such that the rear focal point thereof is positioned at the center of the pupil of the eyeball E of a viewer (a patient with an eye disease), a portion, which is not clouded, of the cornea, and the artificial pupil (hereinafter referred to as the pupil center or the like). In such a configuration, a conjugate points of the pinhole 2 can be placed at the pupil center or the like of the eyeball E, thereby making it possible to give wider view to the patient with an eye disease, as compared with that in a configuration in which the pinhole 2 is directly placed in front of the eyes.

In a video providing apparatus shown in FIG. 5(a), a normal molded type LED 16 is used as a light source, and light emitted from the molded type LED 16 is supplied as it is to a liquid crystal display panel 1. Video light obtained through the liquid crystal display panel 1 is introduced into the eyeball E of a viewer by an ocular optical system 20. In such a configuration, the distance between the molded type LED 16 and the liquid crystal display panel 1 can be sufficiently maintained, thereby making it possible to enlarge the parallelism of the light from the light source. The parallelism of the light from the light source is lower, as compared with that in the configuration shown in FIG. 3(a). Accordingly, the light is more greatly lost. However, the number of optical elements is small, which is favorable for simplification of the configuration and reduction in cost.

A video providing apparatus shown in FIG. 5(b) comprises a parallel light source 10'. The parallel light source 10' uses a normal molded type LED 16 as a light source, and has a configuration in which the molded type LED 16 is arranged at the focal point of a collimator lens 17 (Koehler illumination). Parallel light from the parallel light source 10' is supplied to a liquid crystal display panel 1, and video light obtained through the liquid crystal display panel 1 is introduced into the eyeball E of a viewer by an ocular optical system 20. In such a configuration, the parallelism of the light from the light source is also lower, as compared with that in the configuration shown in FIG. 3(a), while being made higher, as compared with that in the configuration shown in FIG. 5(a).

A video providing apparatus shown in FIG. 6(a) comprises a parallel light source 10". The parallel light source 10" uses a chip type (unmolded) LED 18 as a light source, and has a configuration in which the chip type LED 18 is arranged at the focal point of a collimator lens 19 (Koehler illumination). Video light obtained by passing parallel light from the parallel light source 10" through a liquid crystal display panel 1 is introduced into a re-diffraction optical system 40. The re-diffraction optical system 40 comprises a lens 41, a lens 42, and a pinhole 2. The lens 41 and the lens 42 are arranged spaced from each other by a distance which is the sum of both their focal lengths, and are so adapted that the pinhole 2 transmits the video light at a beam waist. The video light which has passed through the re-diffraction optical system 40 is introduced into an ocular optical system 20' through a relay optical system 30 composed of a relay lens or the like. In this configuration, a conjugate points of the pinhole 2 can be placed at the pupil center or the like, as in the configuration shown in FIG. 4, thereby making it possible to give wider view to a patient with an eye disease, as compared with that in a configuration in which the pinhole 2 is directly placed in front of the eyes.

A video providing apparatus shown in FIG. 6(b) uses a chip type (unmolded) LED 18 as a light source, converges emitted light (dispersive light) of the chip type LED 18 at a lens 50, and introduces the emitted light into a liquid crystal display panel 1. Video light in a converging state which has passed through the liquid crystal display panel 1 is changed into video light in a dispersive state again through a pinhole 2 arranged at its converging position. Video light in the dispersive state is introduced into an ocular optical system 20". The ocular optical system 20" is composed of only a lens 22. The lens 22 converges the video light in the dispersive state, and is provided such that its converging point is positioned at the pupil center or the like of the eyeball E of a viewer (a patient with an eye disease). Even in such a configuration, a conjugate points of the pinhole 2 can be placed at the pupil center or the like, thereby making it possible to give wider view to the patient with an eye disease, as compared with that in a configuration in which the pinhole 2 is directly placed in front of the eyes. Moreover, the necessity of an optical system required to convert dispersive light into parallel light is eliminated. A portion, corresponding to the re-diffracted optical system 40 required to enlarge the depth of focus in FIG. 6(a), described above, is realized by an optical system from the lens 50 to the pinhole 2, thereby making it possible to increase the luminance and reduce the size by shortening an optical path without reducing the utilization efficiency of light.

Although in the foregoing description, the optical system from the light source to the eyeball is linearly configured, it may be nonlinearly configured using a mirror or a prism. Although the lens is used as a convergent element, it can be also replaced with a hologram light convergent element or a concave mirror. Although the transmission type liquid crystal display panel 1 is illustrated as an spatial light modulator, it is possible to use another transmission type video display panel, a reflection type liquid crystal display panel, and another video display panel (DMD: Digital Micromirror Device, etc.). Further, the LED can be replaced with a light emitter for emitting non-oscillation natural emission light, for example, a small-sized lamp or a white light source guided by an optical fiber.

As described in the foregoing, according to the present invention, the video produced by the spatial light modulator is not affected by the lens function even when it passes through the crystalline lens of the eyeball, and is directly projected onto the retina even when it passes through the artificial pupil, thereby making it possible to clearly recognize the video. Since the light emitter for emitting the non-oscillation natural emission light is used as a light source, thereby making it possible to restrain the production of coherent noise (video noise). Even if light from each pixel portion of the spatial light modulator has a slight expanse, a bundle of light rays is narrowed down, thereby making it possible to give a large depth of focus to recognize clear video. Further, in the configuration in which the conjugate points of the pinhole can be placed at the pupil center or the like of the eyeball, wider view can be given to the patient with an eye disease, as compared with that in the configuration in which the pinhole is directly placed before the eyeball. In the configuration in which the necessity of the optical system required to convert dispersive light into parallel light is eliminated, the video providing apparatus can be miniaturized by reducing the optical path length. It goes without saying that the video providing apparatus is not only effective for the patient with an eye disease but also usable even by a ordinary person. There are differences in the degree of refraction of the eyeball optical system among individuals who are extremely nearsighted to extremely farsighted, although physically unimpaired. In the video providing apparatus, however, the depth of focus of presented video is very large, thereby eliminating the necessity of accommodation, for each ordinary person, the dioptor scale thereof. Further, video providing apparatuses are respectively put on both the eyes to present videos having binocular parallax, thereby also making stereoscopic view possible. In the case, the video providing apparatus capable of viewing video even in any state where the crystalline lens is adjusted (refracted), it is possible to solve the problem of the dissociation of accommodation and convergence which is produced in stereoscopic view.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video providing apparatus comprising:
    a light source comprising a light emitter for emitting non-oscillation natural emission light;
    a video producing optical system for modulating the light from said light source in an spatial light modulator and outputting video light;
    a convergent element for converging said video light; and
    a pinhole arranged at the rear focal point of said convergent element,
    a viewer being caused to view video by Maxwellian view.

2. The video providing apparatus according to claim 1, wherein
    said light source is a parallel light source for converting dispersive light into parallel light and giving the parallel light to said spatial light modulator.

3. The video providing apparatus according to claim 2, wherein
    said parallel light source comprises a pinhole at the mutual focal points of a pair of convergent elements.

4. The video providing apparatus according to claim 3, wherein
    the pinhole in said parallel light source is provided with light diffusion means.

5. The video providing apparatus according to claim 4, wherein
    said light source is a white light source, and
    said spatial light modulator comprises respective modulators for read light, green light, and blue light.

6. The video providing apparatus according to claim 3, wherein
    said light source is a white light source, and
    said spatial light modulator comprises respective modulators for read light, green light, and blue light.

7. The video providing apparatus according to claim 2, wherein
    said light source is a white light source, and
    said spatial light modulator comprises respective modulators for read light, green light, and blue light.

8. The video providing apparatus according to claim 1, wherein
    said light source is a white light source, and said spatial light modulator comprises respective modulators for read light, green light, and blue light.

9. A video providing apparatus comprising:
    a light source comprising a light emitter for emitting non-oscillation natural emission light;
    a video producing optical system for modulating the light from said light source in an spatial light modulator and outputting video light;
    a first convergent element for converging said video light; and
    an optical system comprising a pair of second convergent elements provided between said video producing optical system and said first convergent element, and a pinhole arranged at the mutual focal points of the second convergent elements,
    a viewer being caused to view video by Maxwellian view.

10. The video providing apparatus according to claim 9, wherein
    said light source is a parallel light source for converting dispersive light into parallel light and giving the parallel light to said spatial light modulator.

11. The video providing apparatus according to claim 10, wherein
    said parallel light source comprises a pinhole at the mutual focal points of a pair of convergent elements.

12. The video providing apparatus according to claim 11, wherein
    the pinhole in said parallel light source is provided with light diffusion means.

13. The video providing apparatus according to claim 12, wherein said light source is a white light source, and said spatial light modulator comprises respective modulators for read light, green light, and blue light.

14. The video providing apparatus according to claim 11, wherein said light source is a white light source, and said spatial light modulator comprises respective modulators for read light, green light, and blue light.

15. The video providing apparatus according to claim 10, wherein said light source is a white light source, and said spatial light modulator comprises respective modulators for read light, green light, and blue light.

16. The video providing apparatus according to claim 9, wherein said light source is a white light source, and said spatial light modulator comprises respective modulators for read light, green light, and blue light.

17. A video providing apparatus comprising:

a light source comprising a light emitter for emitting non-oscillation natural emission light;

a video producing optical system for conversing dispersive light from said light source to provide the convergent light to an spatial light modulator, and outputting video light in the converging state modulated by the spatial light modulator;

a pinhole provided at a converging point of the video light in said converging state; and an optical element for converging the video light in the dispersive state which has passed through said pinhole and positioning the converging point at the position of the eyeball of a viewer, the viewer being caused to view video by Maxwellian view.

18. The video providing apparatus according to claim 17, wherein said light source is a white light source, and said spatial light modulator comprises respective modulators for read light, green light, and blue light.

* * * * *